Nov. 10, 1925.

E. C. BREMER ET AL 1,561,211

ELECTRICALLY OPERATED AUTOMATIC WEIGHING MACHINE

Filed July 8, 1924 5 Sheets-Sheet 1

INVENTORS
Edward C. Bremer
Walter J. Schaefer
BY
ATTORNEYS

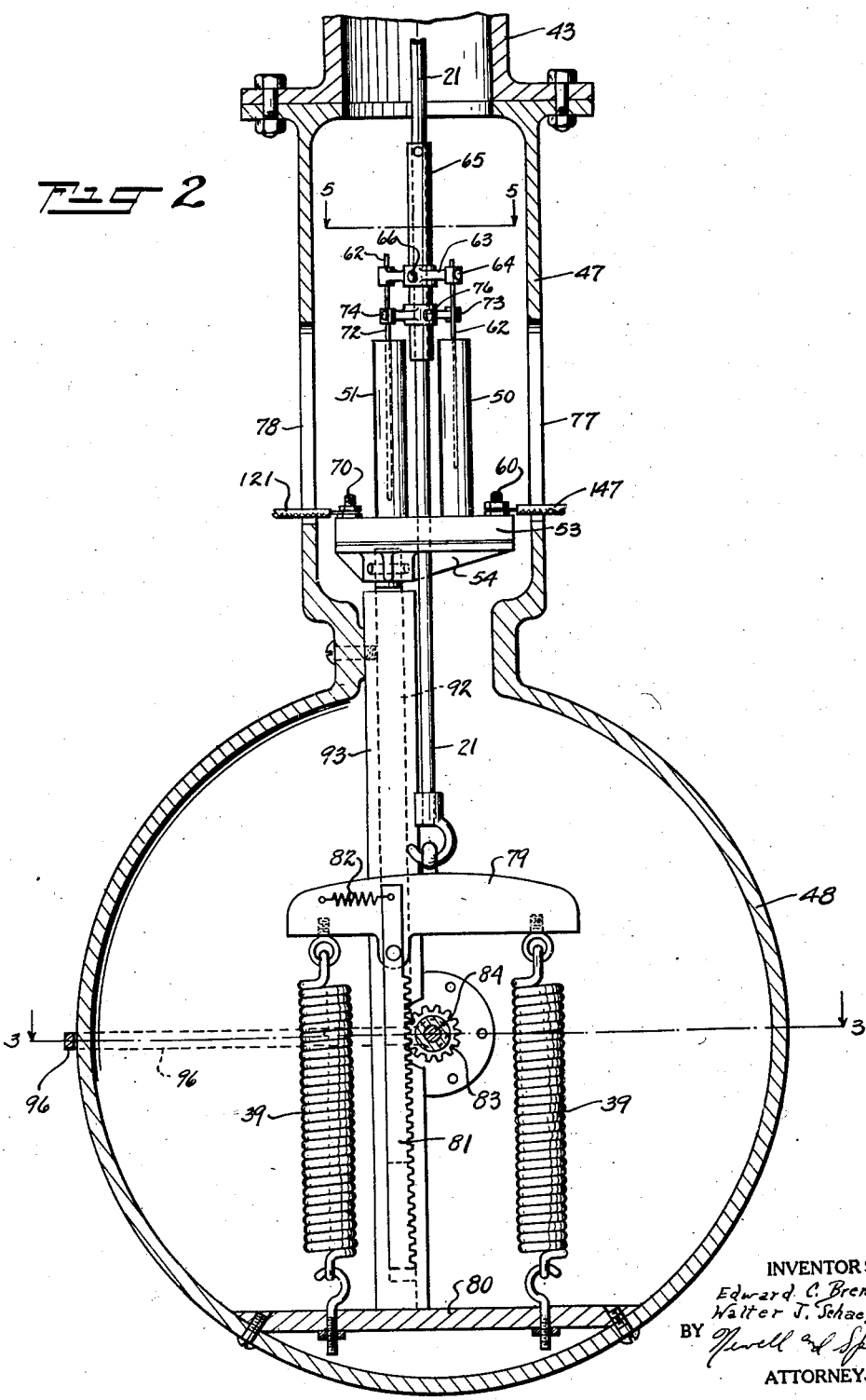

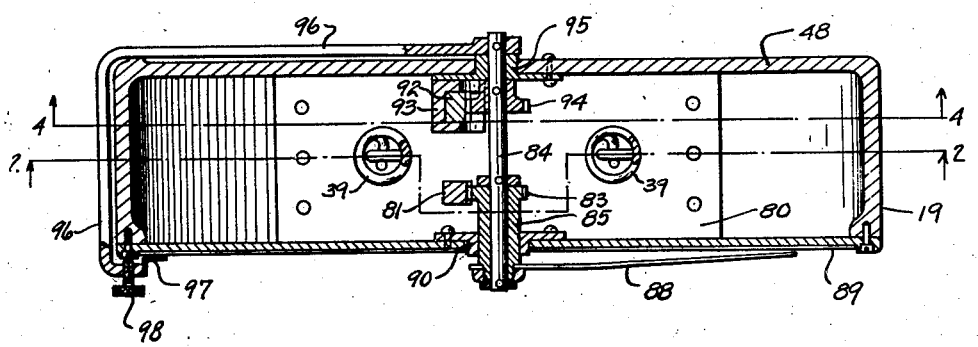
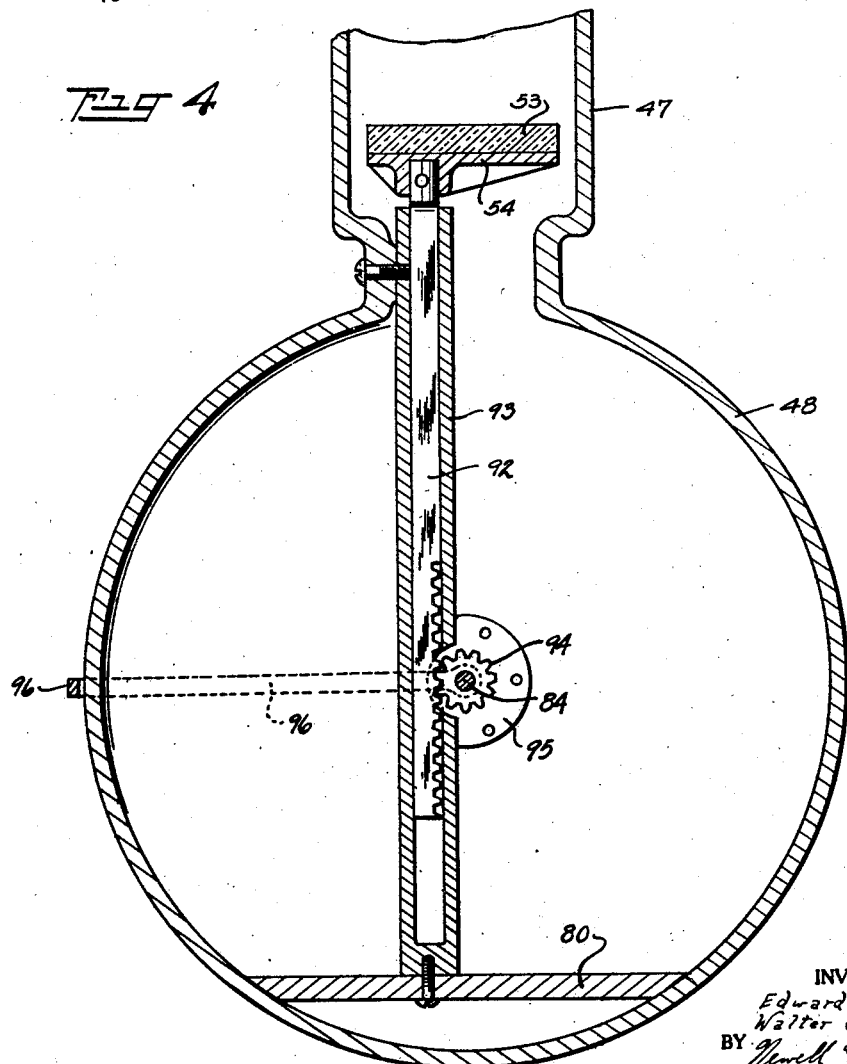

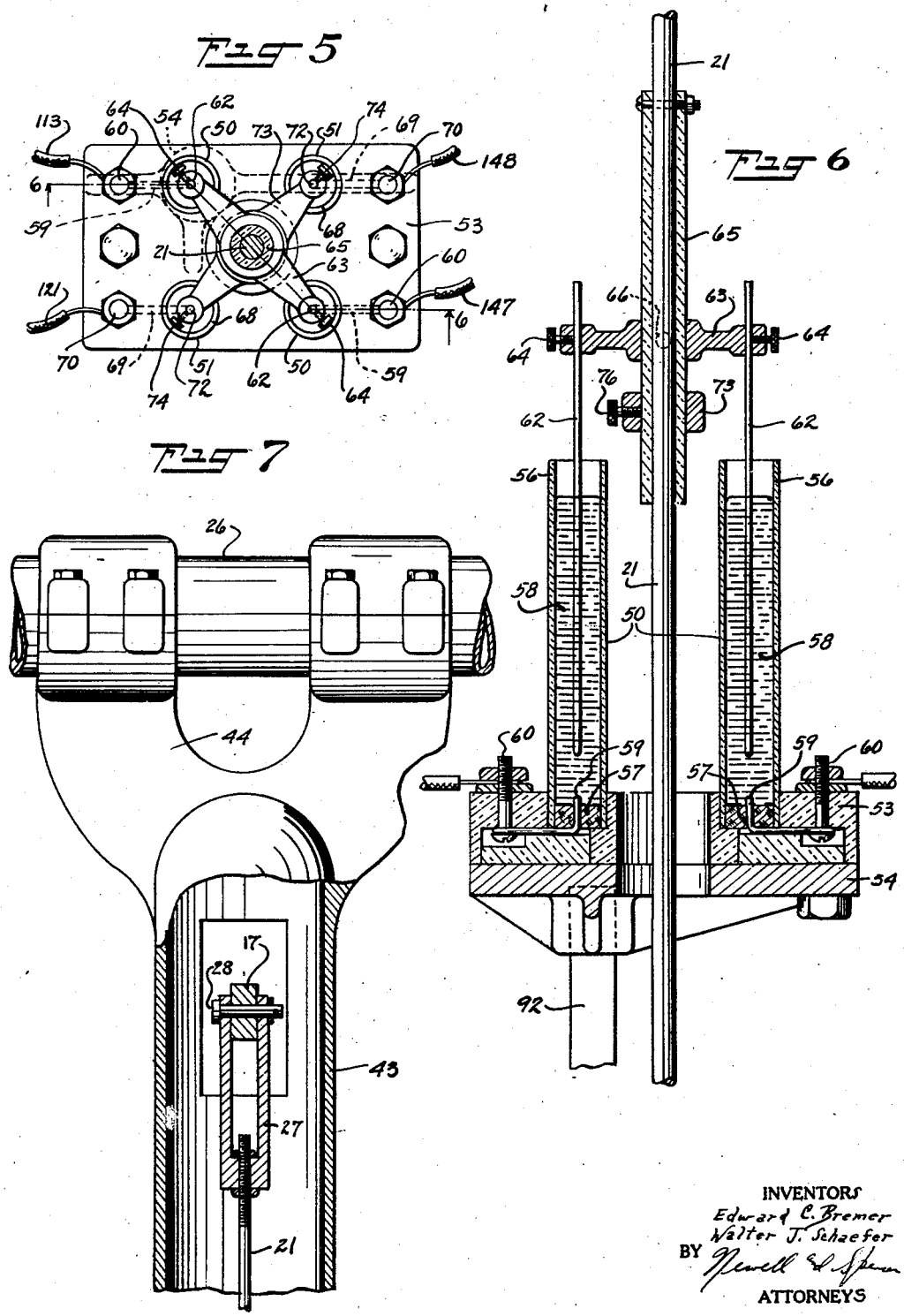

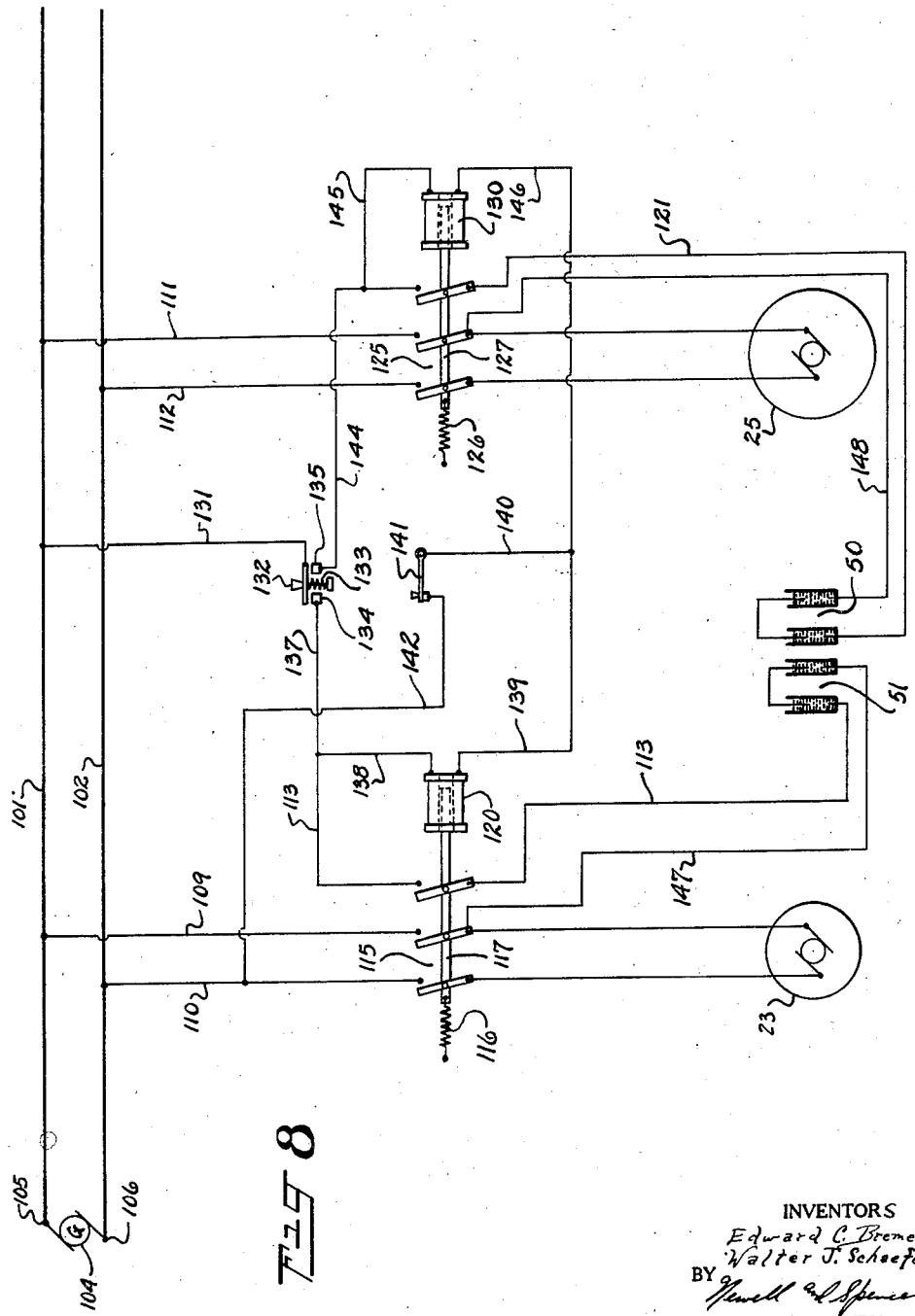

Patented Nov. 10, 1925.

1,561,211

UNITED STATES PATENT OFFICE.

EDWARD CHARLES BREMER AND WALTER JOHN SCHAEFER, OF SAGINAW, MICHIGAN, ASSIGNORS TO BAKER-PERKINS COMPANY, INC., OF WHITE PLAINS, NEW YORK.

ELECTRICALLY-OPERATED AUTOMATIC WEIGHING MACHINE.

Application filed July 8, 1924. Serial No. 724,885.

*To all whom it may concern:*

Be it known that we, EDWARD CHARLES BREMER and WALTER JOHN SCHAEFER, citizens of the United States, residing at Saginaw, in the county of Saginaw and State of Michigan, have invented a certain new and useful Improvement in Electrically-Operated Automatic Weighing Machines, of which the following is a clear, full, and exact description.

This invention relates to weighing machines and particularly to electrically operated machines which are adapted to weigh off automatically definite quantities of a given material.

It is important that machines of this type operate at a relatively high speed, with ease and precision, as well as with the utmost possible reliability. It is, therefore, an object of the present invention to provide a machine which will automatically weigh off exact quantities of a material as quickly as is practicable with complete accuracy, and which will operate smoothly and in a thoroughly reliable manner.

In order to insure smoothness of operation and accuracy of results, the invention includes as one of its features the provision in the operating circuit of the machine of a mercury circuit breaker or cut-out, comprising a conducting member movable into and out of a column of mercury in response to the movements of the weight-responsive portion of the weighing mechanism.

In order to make such a machine thoroughly reliable in operation and to prevent accidental oscillation of the balance arm, or other weight-responsive means, from opening or closing the circuit through the mercury cut-out, or other circuit breaker, at an improper time in the operation of the machine, so as to cause a false operation of its parts, the invention includes as another feature thereof the provision of a circuit arrangement, whereby the operation of the circuit breaker is only effective at such times as is necessary for the correct operation of the machine.

In certain known types of weighing machines, means are employed to increase the accuracy thereof by curtailing the supply of material to the weighing hopper or equivalent member toward the end of the weighing operation. One device used for this purpose comprises separately controlled supply members, the supply from one of which is cut off before the completion of the weighing operation. A particular feature of the present invention is the employment in connection with such a machine of a double mercury cut-out, one member of which is in the circuit which controls one of the supply devices, and the other member of which is in the circuit which controls the other of said devices, the contact elements of the cut-out being so arranged that contact will be broken in one cut-out member before contact is broken in the other. Such an arrangement is included in the particular embodiment of the invention shown and described.

The invention will be described in detail in connection with a flour and water supply weighing machine, such as described in the application of Eugene Gase, Serial No. 684,942, filed January 8, 1924, for use in connection with a dough mixing and kneading machine, although it is by no means limited to such use. Such an embodiment of the invention is shown in the accompanying drawings, in which Fig. 1 is a view mainly in elevation but partly in cross section, showing an automatic weighing machine suitable for use in connection with a mixing and kneading machine, such as is used in commercial baking.

Fig. 2 is a sectional view through the line 2—2, Figure 3 of the circuit breaker box and the dial casing with the sides thereof removed to reveal the mercury cut-outs, the scale springs, and a portion of the dial mechanism;

Fig. 3 is a sectional view of the dial mechanism through the lines 3—3 in Fig. 2;

Fig. 4 is a sectional view of the dial mechanism through the lines 4—4 in Fig. 3;

Fig. 5 is a top view of the mercury cut-outs through the line 5—5 in Fig. 2;

Fig. 6 is a cross-sectional view of the cut-outs through the line 6—6 in Fig. 5;

Fig. 7 is a detail view partly in section, showing the connection between the balance arm and the weighing rod, and also the means for supporting the casings enclosing the weighing rod, the circuit breakers, and the dial mechanism; and Fig. 8 illustrates the circuit connections employed in the operation of the machine.

Figure 1:
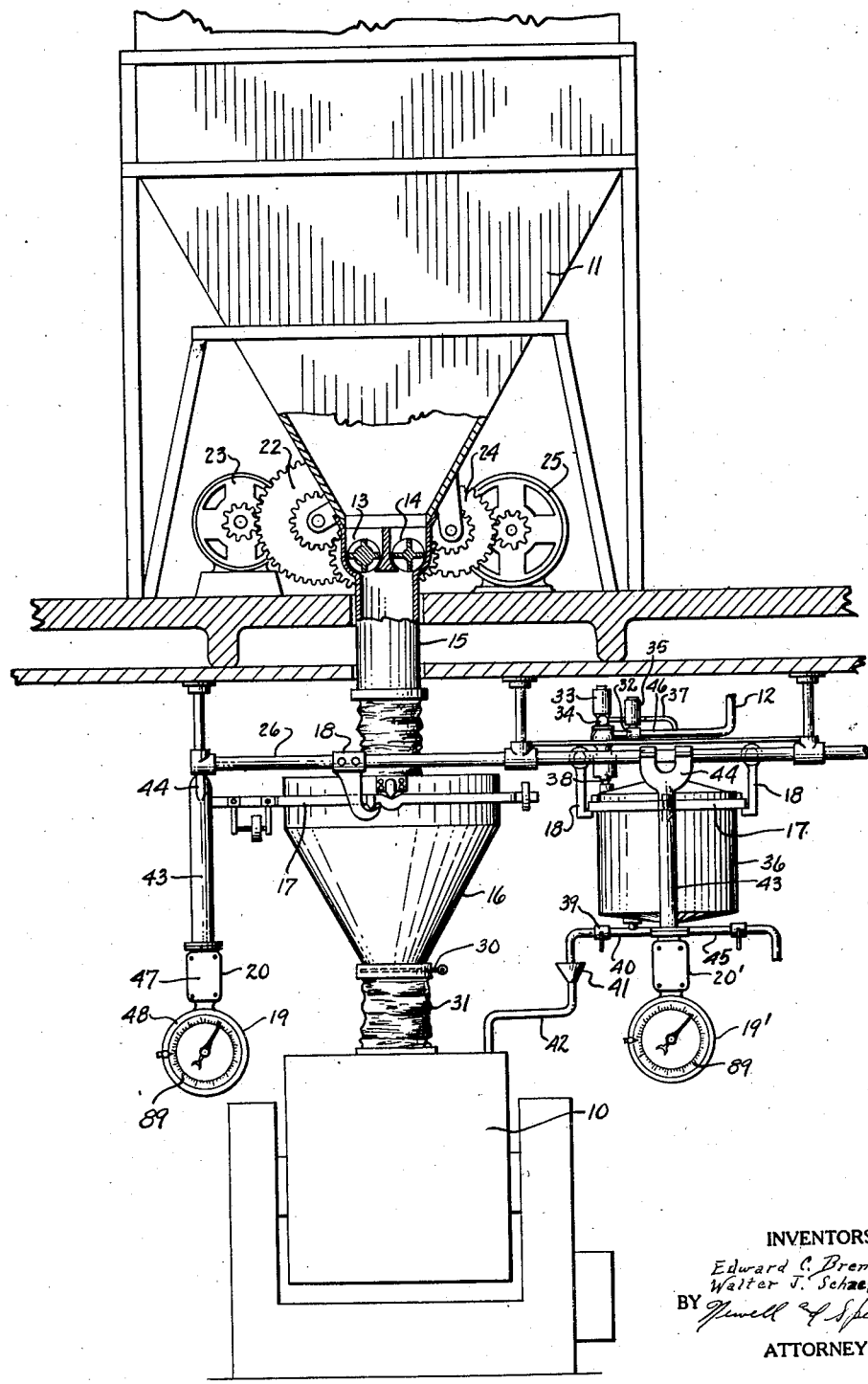

Fig. 1 shows a flour bin 11 and a pipe 12 respectively for the necessary solid constituents and watery liquid for a kneading machine 10. The mechanism for weighing off the solid component of a batch, such as a flour mixture, which mechanism may with certain modifications be adapted for general use in the weighing of solid materials, comprises a pair of conveyors 13 and 14 by means of which flour is carried from the bin 11 to a chute 15, by which it is conducted to a weighing hopper 16. This hopper is pivoted upon a balance arm 17 which oscillates on suitable seats arranged on brackets 18 which are suspended from a framework 26. The balance arm is connected to a weighing rod 21, by any suitable means, such as a U-shaped bracket 27, pivotally mounted on the arm by a pin 28 (Fig. 7).

The weighing rod and its connections are enclosed in a casing 43 suspended by means of a bracket 44 from the framework 26. To the weighing rod 21 are attached the movable members of a double mercury cut-out 20, or other suitable circuit breaking means, and a dial mechanism 19 to be described below; and the lower end of the rod is secured to scale springs 39 in a manner to be later described in detail.

The double mercury cut-out is enclosed in a box 47 attached to casing 43, and the dial mechanism is enclosed in a casing 48 attached to box 47. Conveyor 13 is operated through a gear train 22 by a small electric motor 23, while conveyor 14 is operated through a gear train 24 by a larger electric motor 25, in such manner that conveyor 14 will operate at a considerably higher speed, and consequently will carry a larger amount of material, than conveyor 13. For example, motor 23 may be made to operate at 900 R. P. M. and may be so geared to conveyor 13 that the latter will operate at 30 R. P. M., while the larger motor 25 making 1200 R. P. M. may be geared to conveyor 14 so as to turn the same at about 120 R. P. M. The double mercury cut-out 20 may be so adjusted and the dial mechanism 19 so arranged that toward the end of the weighing operation, by means to be described below, the circuit through which current is supplied to the larger motor will be broken by the operation of one of the mercury cut-outs, whereafter only the small quantity of material carried by conveyor 13 will enter the weighing hopper 16. If the double mercury cut-out 20 is properly adjusted and the dial mechanism 19 correctly set, the operation of the conveyor 13 will continue until the required amount of flour has been carried to hopper 16, whereupon the other cut-out will operate in a manner to be later set forth to interrupt the current supplied to motor 23 so as to stop conveyor 13. The weighed off flour is removed from the weighing hopper 16 by the opening of a valve or shutter 30, which is preferably hand operated, so as to permit flour to enter the kneading machine 10 through a chute 31.

The portion of the weighing mechanism which illustrates one way in which the invention is applied to the weighing of liquids comprises a weighing tank 36 which is pivoted on a balance arm 17 oscillating on brackets 18 connected to a weighing rod 21, enclosed in a casing 43 attached to framework 26 by means of a bracket 44, all of which parts are identical with the similarly numbered parts described in connection with the weighing hopper 16. Similarly, there is associated with the weighing rod of tank 36, a double mercury cut-out 20' and a dial mechanism 19', which are identical with double mercury cut-out 20 and dial mechanism 19.

The tube 12 which supplies liquid to the tank 36 is divided into a larger branch 46 and a smaller branch 37 in which are inserted valves 32 and 34 respectively, from which the liquid enters tank 36 through a pipe 38. Valves 32 and 34 are equipped with electro-magnets 35 and 33 respectively, which are adapted to hold them open when energized. These magnets are controlled by the members of double mercury cut-out 20', in the same manner that motors 25 and 23 are controlled by double mercury cut-out 20. Thus, when double mercury cut-out 20' is properly adjusted and dial mechanism properly set, magnet 35 will be deenergized toward the end of the weighing operation so as to cut off the supply of liquid through the larger branch 46 of pipe 12 and to permit liquid to be carried to the tank only through the smaller branch 37, until such an amount of liquid is supplied to the weighing tank as to operate the other member of the double mercury cut-out 20', so as to de-energize magnet 33 and to cut off the supply of liquid through branch 37. After the operation of the weighing mechanism the liquid may be removed from the tank 36 by the opening of a cock 39 in a pipe 40 through which the liquid flows into a funnel 41 and through a stationary pipe 42 to a kneading machine 10. In case two kneading machines are to be supplied with liquid, a second pipe 45 may be provided from tank 36 to carry liquid to the second machine.

Figs. 2 and 6 illustrate a form of double mercury cut-out which is well adapted for use in connection with the machine illustrated. It comprises a pair of mercury cut-outs 50 and 51, the tubes of which are set in an insulating member 53 mounted on a metallic bracket 54. Cut-out 50 comprises a pair of tubes 56, preferably of glass, each having a stopper 57 of cork or similar material in the base thereof and containing a column of mercury 58. Through each cock 57 and into each of mercury columns 58 there extends a conductor 59 connected to a terminal 60 to which are fastened circuit connections to be described below. A pair of pins 62 are shown in Fig. 6 as projecting into the mercury columns 58. These pins are adjustably mounted on a bracket 63 by means of set screws 64. Bracket 63 is mounted by means of a set screw 66 on an insulating tube 65 which is slid over rod 21 and rigidly affixed thereto.

Similarly mercury cut-out 51 is composed of a pair of tubes 68, each containing a column of mercury into which projects, through a cork in the base of the tube, a conductor 69 connected to a terminal 70, to which one of the circuit connections for cut-out 51 are attached. Similarly also a pair of pins 72 adjustably mounted on a bracket 73 by means of set screws 74 are adapted to project into the mercury columns in tube 68; and bracket 73 is adjustably mounted on tube 65 by means of a set screw 76. The position of brackets 63 and 73 and of pins 62 and 72 should be so adjusted that pins 72 will project further into the mercury columns in tubes 68, than pins 62 project into the mercury columns 58 so that as the rod 21 is carried upwardly by the movement of the balance arm 17 in response to an increasing weight of material in hopper 16 or in tank 36 pins 62 will be withdrawn from their mercury columns before pins 72 are withdrawn from theirs. Set screws 64 and 74 permit the proper adjustment of pins 62 and 72 upon brackets 63 and 73 respectively, while set screws 66 and 76 permit the correct positioning of the brackets upon insulating tube 65. Thus, these parts may be so set that the pins of the cut-outs will break contact with their respective mercury columns at the proper relative times in the operation of the machine. Box 47 has openings 77 and 78 formed therein so as to permit these adjustments to be readily made.

The lower end of rod 21 extends into the dial casing 48, as shown in Fig. 2, and is pivotally attached to a bracket 79 to which are fastened the upper ends of the scale springs 39, the lower ends of which are secured to a crossbar 80 which is rigidly fixed to the casing 48 on the dial mechanism. A rack bar 81 is pivotally suspended from the bracket 79 and is pressed by means of a spring 82 against a gear wheel 83 meshing therewith. As is shown in Fig. 3, gear wheel 83 is revolubly mounted on a shaft 84 which extends through the center of the dial mechanism. The hub 85 of gear wheel 83 is prolonged so as to extend outside the front of the casing 48, and has attached thereto a pointer 88 which indicates the weight of material in the hopper 16 (or the tank 36) upon a calibrated scale 89 (Fig. 1); The hub 85 turns within a bearing 90, fastened to the front of the dial casing.

The machine will weigh any required quantity of material automatically by setting, when the weighing receptacle is empty and the pointer 88 on the zero point, the bracket 54 carrying the mercury tubes 50 and 51 so that the pins 73 dip so far into the mercury contained in the tubes 51, that, when the material entering the weighing receptacle raises the scale beam 17 and thus also the pins 73, the latter emerge from the mercury and thereby stop the supply of material to the weighing receptacle, as soon as the required quantity of the same has entered the latter. The length of the pins dipping into the mercury of the cut-outs is conveniently controlled by means arranged at the dial-mechanisms 19 and 19' and adapted to set an indicator along the dial 89 in accordance with the required quantity of material to be weighed.

This means is illustrated in Figures 3 and 4 and includes a rack bar 92 mounted on the bracket 54 and slidably held within a sleeve 93 which is rigidly affixed to crossbar 80 and to the dial casing 48, as shown in Fig. 4. Into an opening in this sleeve there is set a gear wheel 94 which meshes with rack bar 92 and is rigidly mounted on shaft 84. This shaft turns at one end in the prolonged hub 85, described above, and at its opposite end in a bearing 95 in the rear of the dial casing. Attached to the latter end of shaft 84 is a lever 96 bent about the dial casing so that its end laps over the front thereof. To this end is attached a pointer 97 which, as shown in Fig. 3, is movable about the calibrated scale 89 on the face of the dial. Thus the operative, by moving the lever 96 so that pointer 97 indicates on the scale 89 the necessary amount of material to be weighed off, will be able to so position bracket 54 carrying the mercury tubes 56 and 68 that the movement of rod 21 will withdraw the pins 62 and 72 from their respective mercury columns at the proper moment to cut off the supply of material to the weighing hopper or tank. In order that the lever 96 and its associated mechanism, including mercury tubes 56 and 68, may be maintained throughout the weighing operation in the position set, a thumb screw 98 is provided in lever 96 so that this lever may be locked against the dial casing.

Fig. 8 shows a circuit arrangement which may be used with the machine described above and by which a false operation of the machine, due to the closing of the mercury cut-outs or other circuit breakers, by accidental oscillations of the balance arm after the required amount of material has been weighed off may be effectively prevented. This circuit arrangement is shown in connection with motors 23 and 25, but is equally adapted for use with the magnets 33 and 35, or with any other current-responsive devices for controlling the supply of material to a weighing hopper or tank. The circuit arrangement illustrated comprises a pair of main line conductors 101 and 102, supplied with current from any convenient source 104 and connected thereto at terminals 105 and 106 respectively. Motor 23 is connected across mains 101 and 102 through conductors 109 and 110, and motor 25 is connected across the mains through conductors 111 and 112. Conductors 109 and 110 together with a conductor 113, which is attached to one side of the mercury cut-out 51, are controlled by the three blades of a triple switch 115, which is normally held open by a spring 116 attached to its actuating bar which forms the armature of an electromagnet 120. In a like manner conductors 111 and 112 together with a conductor 121, which is attached to one side of the mercury cut-out 50, are controlled by the three blades of a triple switch 125, which is normally held open by a spring 126, attached to a bar 127 forming the armature for an electromagnet 130. A lead 131 runs from main 101 to a starting switch 132 normally held open by a spring 133 and adapted to close two contacts 134 and 135.

In the operation of the machine starting switch 132 is closed either by hand or by suitable automatic means at the beginning of a weighing operation. The closing of the switch completes a circuit running from terminal 105 through conductors 101 and 131, contact 134, a conductor 137, a conductor 138, electromagnet 120, a conductor 139, a conductor 140, a previously closed operating switch 141, a conductor 142, and conductors 110 and 102, to terminal 106. Electromagnet 120 is thus energized and attracts its armature 117 so as to close triple switch 115 so as to close a circuit through conductors 109 and 110 to connect motor 23 across the line circuit so as to start conveyor 13. Simultaneously with the closing of contact 134, contact 135 will be closed to complete a circuit from terminal 105, through conductors 101 and 131, a contact 135, a conductor 144, a conductor 145, electromagnet 130, a conductor 146, a conductor 140, operating switch 141, conductors 142, 110 and 102, to terminal 106. Electromagnet 130 is thus energized and attracts its armature, so as to close triple switch 125, connecting motor 25 across the line circuit and starting the conveyor 14.

The closing of triple switch 115 also completes a circuit running from a terminal 105 through conductors 101 and 109, a branch conductor 147, a mercury cut-out 51, conductors 113 and 138, electromagnet 120, conductors 139 and 140, switch 141, conductors 142, 110, and 102 to terminal 106. Similarly the closing of triple switch 125 also completes a circuit running from terminal 105 through conductors 101 and 111, a branch conductor 148, mercury cut-out 50, conductors 121 and 145, magnet 130, conductors 146 and 140, switch 141, conductors 142, 110, and 102, to terminal 106. Thus, there are established circuits through electromagnets 120 and 130, which will keep these magnets energized, and switches 115 and 125 closed after the release of starting switch 132, and until the circuits last traced are broken by the withdrawal of the pins of their respective mercury cut-outs from the mercury columns thereof at or toward the end of the weighing operation, whereupon the magnets included in these circuits will be de-energized and springs 116 and 126 will open their respective switches. When, for example, cut-out 51 has operated, the magnet 120 will be de-energized and spring 116 will draw bar 117 away from magnet 120 so as to open triple switch 115 and not only break the circuit of motor 23, but to break the circuit through cut-out 51 and conductor 113, so that if the pins of cut-out 51 are later plunged accidentally into the mercury columns thereof, no energizing circuit for the magnet 120 will be established thereby, and the magnet will remain de-energized and the switch 117 open, until starting switch 132 is again operated.

It will thus be apparent that this circuit arrangement or other arrangements embodying the basic idea thereof will be exceedingly useful in connection with automatical weighing machines, and will do much to increase their reliability by eliminating the possibility of excessive amounts of material being supplied to the weighing hopper or tank, after a circuit breaker has once been operated thereby. It will, of course, be apparent that this type of circuit may be used for any variety of circuit breaker, and is not limited to use with the mercury cut-out shown.

It will also be apparent that the invention as a whole is not limited to the particular embodiments thereof shown and described.

What we claim as new is:

1. In a weighing machine, a balance arm, a container for the material to be weighed attached to one end of said arm, a rod attached to the other end of said arm, a fixed spring member attached to the free end of the rod, electrically operated means for controlling the supply of material to said container, an electrical circuit, connections to said electrical circuit for said electrically operated means, a mercury cut-out comprising a pair of tubes each containing a column of mercury and a pair of electrically connected pins insulatedly mounted on said rod, means including said mercury cut-out for breaking said connections, a base of insulating material for said tubes, and means for adjusting the position of said base and said tubes so that the pins break contact with the mercury contained in said tubes when the balance arm is in any desired position.

2. In a weighing machine, a balance arm, a container for the material to be weighed attached to one end of said arm, a rod attached to the other end of said arm, a pair of fixed spring members attached to the free end of said rod, a rack connected with said rod, a gear meshing with said rack, a pointer turning with said gear, a calibrated scale for said pointer, a pair of electrically operated means for supplying the material to be weighed to said container, an electric circuit, connections to said electric circuit for each of said electrically operated means, a double mercury cut-out comprising two pairs of tubes each containing a column of mercury, a base of insulating material for mounting said tubes, leads to said circuit from each pair of tubes, a pair of brackets insulatedly mounted one above the other on said rod, a pair of pins so positioned in each of said brackets that their lower ends will be immersed in and withdrawn from said mercury columns by the movements of the balance arm and the rod, means including said mercury cut-outs for successively disconnecting said electrically operated means from said circuit as successively increasing amounts of material are supplied to said container, a rack connected to said base, a gear meshing with said rack, a bar fixed to said gear and movable about said calibrated scale for positioning said base in said tubes, and means for locking said bar in any desired position.

3. In a weighing machine, a container for the material to be weighed, electrically-operated means for supplying material to said container, a main electrical circuit, connections to said circuit for the electrically operated means, an auxiliary circuit containing an electrical cut-out, a triple switch whereby said connections and said auxiliary circuit are closed, means for normally maintaining said switch open, electromagnetic means in said auxiliary circut for maintaining said switch closed, a starting push button, and a second auxiliary circuit including the push button and said electromagnetic means for closing said switch.

4. In a weighing machine, a container for the material to be weighed, a pair of electrically operated means for supplying the material to the container, a main circuit, connections to said circuit for each of said electrically operated means, a pair of electric cut-outs, means to successively operate the cut-outs as successively increasing amounts of material are supplied to said container, a pair of auxiliary circuits each containing one of said electrical cut-outs, a pair of triple switches each of which will close one of said connections and one of said auxiliary circuits, means for normally maintaining said switches open, electromagnetic means in each of said auxiliary circuits for maintaining its respective switch closed, a starting push button, a pair of contacts closed thereby, and a pair of circuits each including one of said electromagnetic means and one of said contacts for closing said switches.

5. In a weighing machine, a balance arm, a container for the material to be weighed attached to one end of said arm, a rod attached to the other end of the arm, a spring member attached to the free end of said rod, electrically operated means for controlling the supply of material to said container, an electrical circuit, connections to said circuit for said electrically operated means, a mercury cut-out comprising a pair of mercury containing tubes, and a pair of pins attached to said rod, means including said cut-out for breaking said connections, the holding member of insulated material for said tubes, and means for adjusting said adjustable members and said tubes so as to cause said pins to come into contact with the mercury in said tubes when the balance arm is in any desired position.

6. In a weighing machine, a container for the material to be weighed, a plurality of electrically operated means for controlling the supply of material to the container, an electric circuit, connections to said electric circuit for each of said electrically operated means, a mercury cut-out comprising a plurality of members, means including one member of said mercury cut-out for breaking each of said connections, and means for successively causing the operation of said mercury cut-out members when successively increasing amounts of material have been supplied to said container.

7. In a weighing machine, a container for the material to be weighed, electrically operated means controlling the supply of material to the container, an electrical circuit, connections to said electrical circuit for said electrically operated means, a balance arm operated by the container, a mercury cut-out operated by the movements of said arm, means including said mercury cut-out for breaking said connections, and means for adjusting said cut-out to operate in response to the movements of the balance arm.

8. In a weighing machine, a balance arm, a container for the material to be weighed attached to one end of said arm, a rod attached to the other end of said arm, a pair of fixed spring members attached to the free end of said rod, a conveyor for supplying the material to said container, an electric motor for operating said conveyor, an electric circuit, connections from said electric circuit to said motor, a mercury cut-out comprising a pair of tubes each containing a column of mercury and a pair of conducting pins insulatedly attached to said rod and adapted to be immersed in and withdrawn from said columns of mercury by the movements of the rod, a holding member for said tubes composed of insulating material, a rack connected to said rod, a gear turned by the rack, a pointer turning with said gear, a calibrated scale for the pointer, a rack attached to said holding member, a gear meshing with said rack, a bar fixed to said gear and movable about said calibrated scale for adjusting said holding member and said tubes, and means for locking said bar in any desired position.

9. In a weighing machine, a container for the material to be weighed, electrically operated means for supplying the material to said container, a main electrical circuit, connections in said circuit for the electrically-operated means, a mercury cut-out, an auxiliary circuit containing the mercury cut-out, a switch for closing said connections and said auxiliary circuit, means for normally maintaining the switch open, an electromagnet in said auxiliary circuit and having said switch as an armature, a momentarily operated switch, and a second auxiliary circuit including the last mentioned switch and said electromagnet.

10. In a weighing machine, a container for the material to be weighed, a plurality of conveyors for supplying material to the container, a motor for operating each of said conveyors, a main circuit, connections to said circuit for each of said motors, a plurality of mercury cut-outs, a plurality of auxiliary circuits each including one of said cut-outs, a plurality of switches by each of which one of said connections and one of said auxiliary circuits are closed, means for normally maintain said switches open, an electromagnet operatively associated with each of said switches and included in the auxiliary circuit closed thereby, a starting push button, a plurality of contacts closed thereby, and a plurality of auxiliary circuits each including one of said contacts and one of said electromagnets for closing the switch associated with the electromagnet.

11. In a weighing machine, a container for the material to be weighed, a weighing rod vertically movable in response to the weight of the material in the container, a tube containing a mercury column, a base for said tube, a pin carried by said rod and movable into said mercury column, circuit connections for said mercury column and said pin, means for adjusting the vertical position of said base, and means on said rod for adjusting the vertical position of said pin.

Signed at Saginaw, Michigan, this 27th day of June, 1924.

EDWARD CHARLES BREMER.
WALTER JOHN SCHAEFER.